(No Model.)
G. J. GRANDPRE.
TIRE TIGHTENER.
No. 574,412. Patented Jan. 5, 1897.
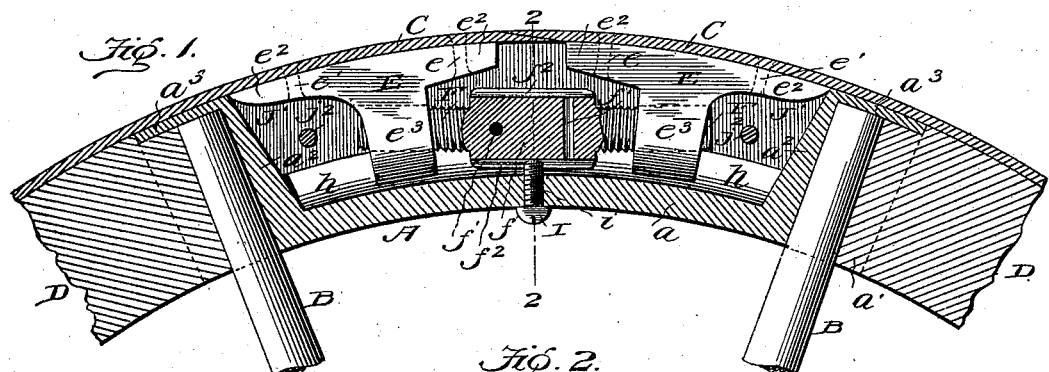
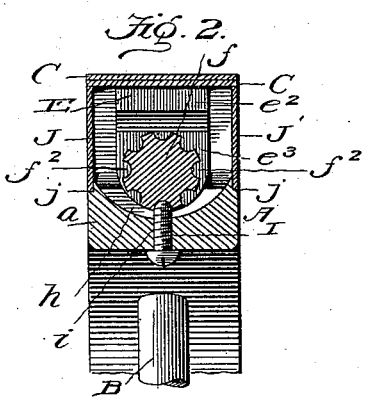
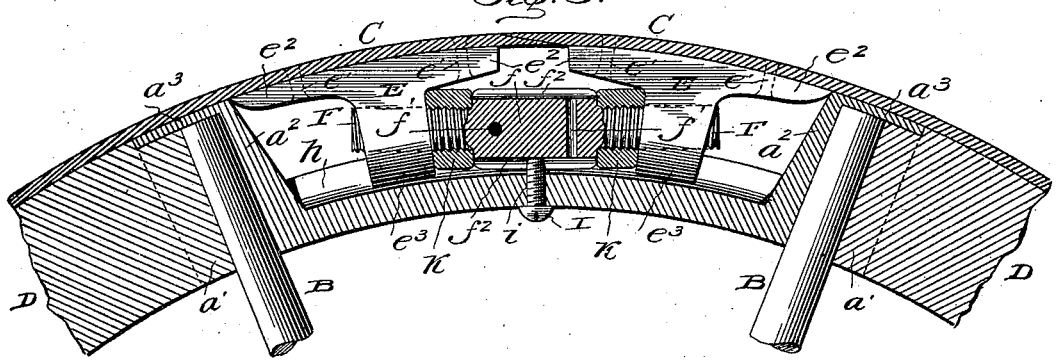
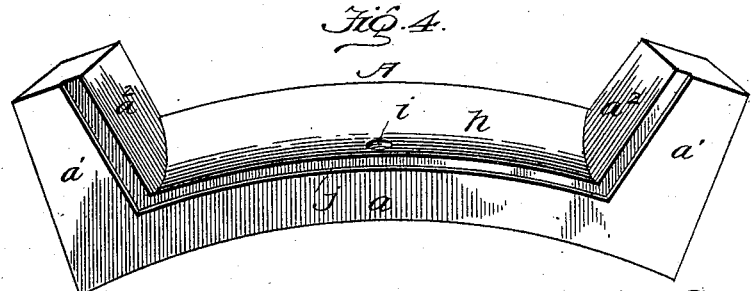
Witnesses:
Grant J. Grandpre.
— Inventor —
By Edson Bros.
— Atty's.

UNITED STATES PATENT OFFICE.

GRANT J. GRANDPRE, OF CHAMBERLAIN, SOUTH DAKOTA.

TIRE-TIGHTENER.

SPECIFICATION forming part of Letters Patent No. 574,412, dated January 5, 1897.

Application filed June 16, 1896. Serial No. 595,819. (No model.)

*To all whom it may concern:*

Be it known that I, GRANT J. GRANDPRE, a citizen of the United States, residing at Chamberlain, in the county of Brule and State of South Dakota, have invented certain new and useful Improvements in Tire-Tighteners; and I do hereby declare the following to be a full, clear, and exact description of the invention, such as will enable others skilled in the art to which it appertains to make and use the same.

My invention relates to improvements in tire-tighteners of the class shown in my prior Letters Patent of the United States, numbered 556,142, in which angle-irons are fastened to adjacent ends of the tire and a right and left threaded bolt is used to draw the angle-irons toward each other for the purpose of tightening the tire.

One object of my present invention is to provide an improved casting which serves as a seat for the outer ends of the two spokes adjacent to the meeting ends of the tire and as a boxing or housing for the angle-irons and adjusting screw-bolt, which casting is easy of application to the wheel, requires no bolts for holding it in place, is strong, cheap of manufacture, and is so formed as to accommodate the angle-irons, screw, and boxing plates, the latter serving to exclude dust and dirt from the screw and angle-irons.

A further object of my invention is to provide means for locking the adjusting-bolt against rotation after the tire has been tightened, thus preventing retrograde movement of the angle-irons under the strain of the tire.

With these and other ends in view my invention consists in the combination, construction, and arrangement of parts, which will be hereinafter fully described and claimed.

I have illustrated the preferred embodiment of my invention in the accompanying drawings, forming a part of this specification, in which—

Figure 1 is a sectional elevation taken longitudinally through a portion of the rim of a wheel, showing my improved means for tightening the tire. Fig. 2 is a vertical transverse sectional view on the plane indicated by the line 2 2 of Fig. 1. Fig. 3 is a sectional elevation somewhat similar to Fig. 1, but illustrating elastic washers on the adjusting-bolt to prevent the escape of lubricant. Fig. 4 is a detail perspective view of the casting.

Like letters of reference denote corresponding parts in all the figures of the drawings, referring to which—

A designates the casting, which is designed to form a part of the rim of the wheel, and which serves the threefold purpose of receiving the outer ends of the two spokes B B, which are adjacent to the meeting ends C C of the tire, of receiving the ends of two of the fellies D of the wheel, and as a housing or boxing for the angle-irons E E and adjusting-bolt F. This casting A is in a single piece of metal, and in its general construction it consists of a body $a$ and the hollow or socketed arms $a'\ a'$. The general longitudinal form of the casting is segmental or arc-shaped similar to a felly of the wheel, in order that the casting may fit between two adjacent fellies and form a part of the rim of the wheel and as a bridge to span the space between the fellies at the place where the two ends of the tire meet each other.

The body $a$ of the casting is curved, as shown, to have its inner side or face flush with the corresponding faces or sides of the fellies adjacent to such casting; but the arms $a'\ a'$ stand outwardly from the body at suitable angles to the axial line of said body. In fact, the arms $a'\ a'$ stand radial, or nearly so, to the hub of the wheel for the purpose of receiving the tenons on the outer ends of the spokes B B. The arms $a'\ a'$ are hollow for the purpose of forming sockets, and they are open at the inner side or face and at the ends of the casting, so as to permit the spoke-tenons to fit in said sockets next to the solid walls $a^2\ a^2$ of the arms and also to permit the ends of the fellies to fit in the open ends of the arms $a'\ a'$, said ends of the fellies lying close up to or against the tenons of the spokes. The outer sides or faces of the arms are closed by the walls $a^3\ a^3$, against which rests the tire G of the wheel, and against these walls $a^3\ a^3$ rest the outer ends of the spoke-tenons, the latter being extended or carried through the sockets in the arms $a'$ of the casting. This construction of the casting enables it to be readily fitted in or applied to the wheel, and as certain of the spokes and fellies are fitted securely in said casting and the parts are bound solidly together by tightening the tire around the wheel-felly the casting is held in place without the employment of devices, such as bolts or rivets, to unite the felly-casting, the fellies, or spokes.

The angle-irons E E may be of wrought or malleable iron or of drop-forgings, and each angle-iron is secured to one end C of the tire by means of rivets $e\ e'$, which pass through the end flanges $e^2$ of the angle-iron. The ends C C of the tire are carried over the felly-casting and across the space between the angular arms $a'\ a'$ of the casting, as shown by Figs. 1 and 3, and in this space between the arms $a'\ a'$, the body $a$, and the ends C C of the tire are situated the angle-irons E E and the adjusting-bolt. The angle-irons have offstanding lugs $e^3\ e^3$, in which are formed reversely-threaded apertures that receive the right and left hand threaded portions of the adjusting-bolt F, which bolt is adapted to be turned so as to draw the angle-irons toward each other and thereby tighten the tire. The bolt F has an enlarged central portion $f$ between the threaded shanks thereof, and this central portion has one or more radial openings $f'$ and a series of longitudinal grooves or corrugations $f^2$.

The body $a$ of the felly-casting A has a longitudinal groove or channel $h$ produced in its outer side or face, and the angle-irons and bolt are so proportioned as to partially fit within this channel or groove, the enlarged central and grooved part $f$ of the bolt lying close down to the bottom of the channel or groove $h$.

In the body $a$ of the felly-casting is provided a threaded aperture $i$, which lies opposite to the grooved part $f^2$ of the bolt F, and in this aperture is screwed a set-screw I, the point of which is designed to fit in one of the grooves or corrugations in the bolt F for the purpose of locking the bolt against rotation and prevents the angle-irons from drawing apart under the strain of the tire. To tighten the tire, the screw I should be withdrawn from the bolt F, a pin or other implement fitted in one of the apertures $f'$ of the bolt, the bolt turned the required distance to draw the angle-irons and tire toward each other, the set-screw I again adjusted to lock the bolt F, and the implement withdrawn from the bolt.

The angle-irons and bolt are inclosed against accumulation or lodgment of dust and dirt by the plates J J'. In the side faces of the felly-casting I provide the marginal recesses or grooves $j$, which preferably extend continuously along the edges of the body $a$ and the arms $a'\ a'$, and in these recesses are fitted the inner and end edges of the plates J J', the outer edges of the plates being within or flush with the tire. These plates J J' are of metal, preferably steel, and they are confined in place by fitting closely to the felly-casting and by transverse bolts $j^2$, which bolts pass through suitable openings in the plates, and they also pass in rear of the angle-irons or between the end walls $a^2$ of the arms $a'$ and the lugs $e^3$ of the angle-irons. If desired, the heads of the bolts may be fitted in countersunk holes in one plate and the nuts on the bolts be housed in countersunk holes in the other plate.

In Fig. 3 of the drawings I have shown my felly-casting and tire-tightener applied to a wheel without the employment of the dust-excluding plates J J', in which case the grooves or recesses $j'$ in the felly-casting may be omitted. In this embodiment of the invention the threaded parts of the bolt are protected from accumulation of dust and dirt by means of the washers or sleeves K, which are made of rubber or other suitable compressible material. These washers or sleeves are fitted on the threaded parts of the bolt between the lugs $e^3$ of the angle-irons and the enlarged central part $f$ of the bolt, and when the bolt is adjusted to draw the angle-bars close up to the shouldered part of the bolt the washers or sleeves are designed to be compressed between the adjacent parts described. It is obvious that the washers or sleeves and the boxing-plates may both be employed, but ordinarily I use only the plates on the washers.

Having thus fully described my invention, what I claim as new, and desire to secure by Letters Patent, is—

1. A felly-casting comprising the body $a$ and the socketed arms $a'$ extending outwardly from the ends of said body and inclined reversely to each other, combined with spokes fitted in the sockets of said arms and bearing endwise against close outer ends of the arms, the felly-section also fitted in the socketed arms, and a tightener device situated in the casting between the angular arms $a'$ thereof, as and for the purposes described.

2. A felly-casting comprising the body and the angular socketed arms $a'$, $a'$, integral with said body, said arms having the solid walls, $a^2$, $a^3$, and open at the ends and inner side of the casting, combined with spokes fitted in said socketed arms and against the walls $a^2$, $a^3$ thereof, the fellies fitted in the ends of the casting, a tire, the angle-irons attached to the tire and lying between the arms $a'$, $a'$ of the casting, and an adjusting-bolt, substantially as described.

3. The felly-casting comprising the body, the angular socketed arms, and the groove or channel $h$ in the outer face of the body and between the arms, combined with spokes, the fellies, a tire, angle-irons fastened to the tire and partially fitting in the groove of the body, a right and left threaded bolt also partially fitted in the groove of the body and said bolt provided with a grooved or corrugated middle part, and a set-screw fitted in the body to engage with the corrugated or grooved middle part of the bolt, substantially as described.

4. The felly-casting comprising the body $a$ and the socketed arms a' which extend outwardly from the ends of said body, said casting provided with the continuous grooves j in the edges of the body and said angular arms, combined with the removable face-plates J having their inner edges fitted in the marginal grooves j of the felly-casting, means for fastening said face-plates in position, a tightener device situated within the felly-casting, between the angular arms thereof, and within the face-plates, and the spokes and felly-sections fitted in the socketed arms of the felly-casting, as and for the purposes described.

5. The combination of a felly-casting having the body and angular socketed arms, the spokes, the fellies, a tire, the angle-irons, the bolt, and the compressible washers or sleeves fitted on the threaded parts of the bolt between the shoulders of the latter and the angle-irons, substantially as described.

In testimony whereof I affix my signature in presence of two witnesses.

GRANT J. GRANDPRE.

Witnesses:
JOHN G. BARTINE,
W. G. KENASTOR.